(12) United States Patent
Webber

(10) Patent No.: US 7,296,999 B2
(45) Date of Patent: Nov. 20, 2007

(54) EDUCATIONAL DISPLAY MITT FOR MAGNETIC PLAYING PIECES AND METHOD

(76) Inventor: Sharon G. Webber, 408 Barrington Dr., Greer, SC (US) 29650

( * ) Notice: Subject to any disclaimer, the term of this patent is extended or adjusted under 35 U.S.C. 154(b) by 424 days.

(21) Appl. No.: 10/981,166

(22) Filed: Nov. 4, 2004

(65) Prior Publication Data

US 2006/0105304 A1    May 18, 2006

(51) Int. Cl.
*G09B 1/08*        (2006.01)
(52) U.S. Cl. ..................................... 434/168; 434/190
(58) Field of Classification Search .............. 434/156, 434/159, 167, 168, 170, 172, 175, 178, 188, 434/190, 260; 2/158–160, 161.6
See application file for complete search history.

(56) References Cited

U.S. PATENT DOCUMENTS

| | | | | |
|---|---|---|---|---|
| 3,636,568 | A | * | 1/1972 | Stuner .......................... 2/161.6 |
| 3,724,101 | A | | 4/1973 | Slezak |
| 4,006,900 | A | | 2/1977 | DeVito |
| 4,519,781 | A | * | 5/1985 | Boyd ........................... 434/156 |
| 4,710,979 | A | | 12/1987 | Bull et al. |
| D334,658 | S | * | 4/1993 | Ivie ............................... D2/619 |
| 5,593,073 | A | | 1/1997 | Finnegan |
| 5,715,539 | A | | 2/1998 | Benecki et al. |
| 5,720,046 | A | * | 2/1998 | Lopez et al. ..................... 2/159 |
| 5,957,692 | A | * | 9/1999 | McCracken et al. ......... 434/159 |
| 6,055,671 | A | | 5/2000 | Fung-Ming |
| 6,142,785 | A | * | 11/2000 | Williams ..................... 434/205 |
| 6,155,836 | A | * | 12/2000 | Hancock ..................... 434/188 |
| 6,238,216 | B1 | | 5/2001 | Menelly |
| 6,530,508 | B1 | | 3/2003 | Devine |
| 6,536,132 | B2 | * | 3/2003 | Helmer ........................... 34/82 |
| 6,618,236 | B1 | * | 9/2003 | Tsuwako et al. ............. 361/220 |
| 6,779,199 | B1 | * | 8/2004 | O'Dea et al. ................. 2/161.6 |
| 6,820,282 | B1 | * | 11/2004 | England et al. .............. 2/161.1 |
| 6,951,464 | B2 | * | 10/2005 | Cubeta et al. .............. 434/159 |
| 7,146,651 | B1 | * | 12/2006 | Lapin ............................. 2/338 |
| 2002/0108162 | A1 | | 8/2002 | Bolds-Ledtr |

* cited by examiner

*Primary Examiner*—Kurt Fernstrom
(74) *Attorney, Agent, or Firm*—McNair Law Firm PA; Cort Flint

(57) ABSTRACT

A teaching system comprising a set of magnetic playing pieces, a display mitt comprising a first panel being associated with the palm of a user of the mitt; including a flexible metallic layer for attracting at least one magnet, an exterior layer covering the flexible layer of the first panel; a second panel associated with the back of a hand of a user of the mitt; a hand space formed between the first and second panels for receiving at least a portion of a hand of a person so as to provide a firm display surface on at least one of the first and second panels; and a hand entrance opening providing access to the hand space so that the mitt may by worn and taken off; whereby the first and second panels form a wearable mitt that can receive the magnetic playing pieces associated with teaching or playing games.

24 Claims, 3 Drawing Sheets

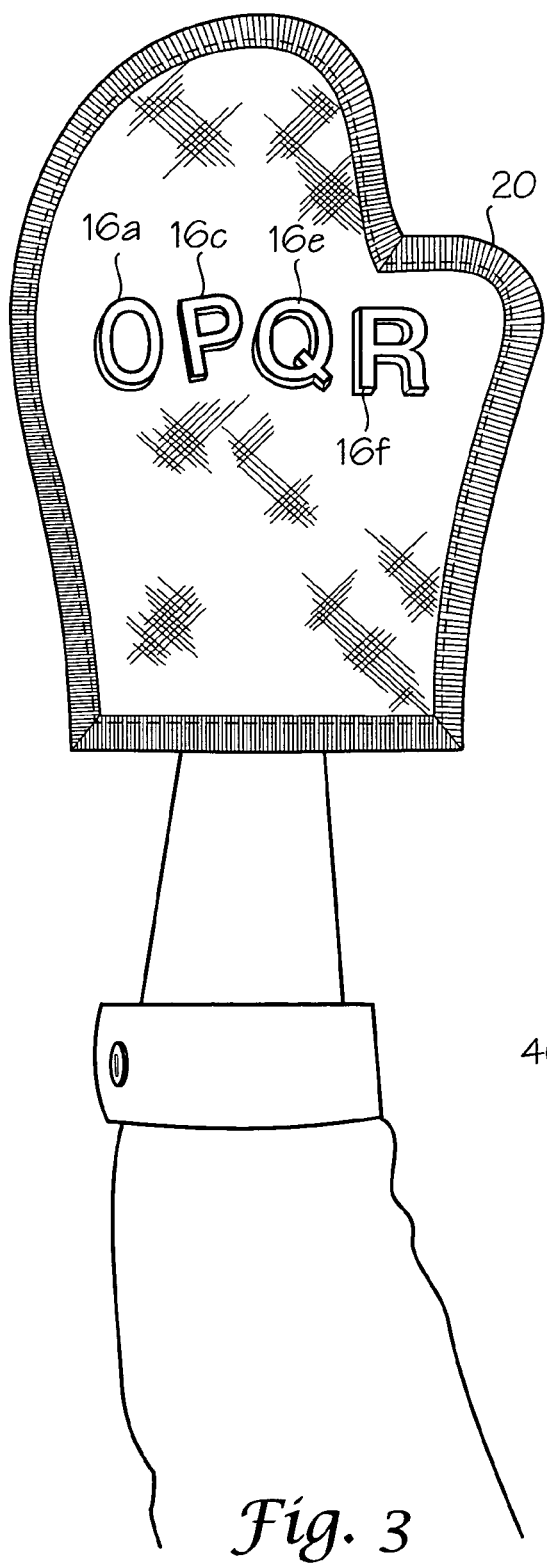
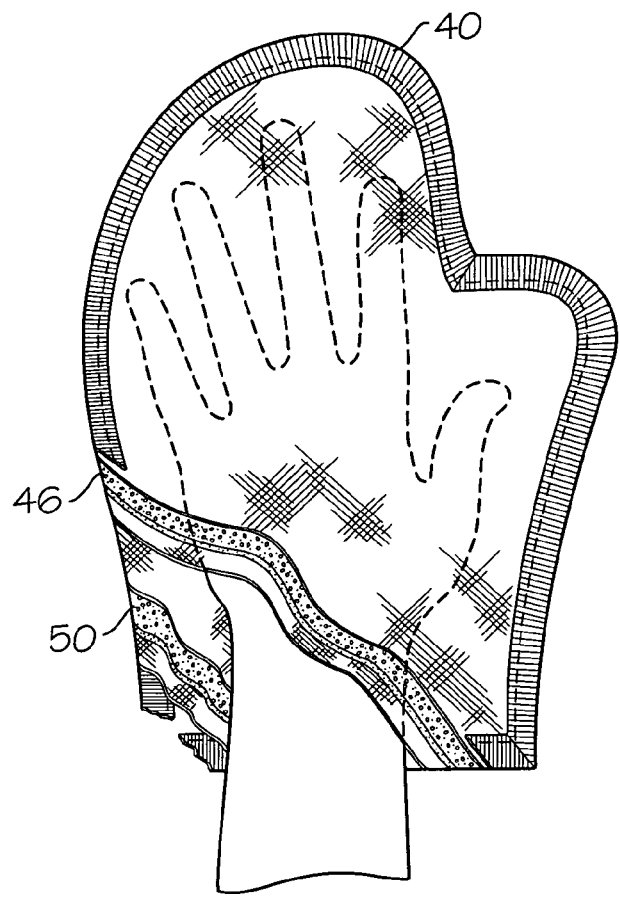
Fig. 3
Fig. 4

EDUCATIONAL DISPLAY MITT FOR MAGNETIC PLAYING PIECES AND METHOD

FIELD OF THE INVENTION

This invention is directed to a display mitt for magnetic playing pieces for use as a teaching, method, and the like.

BACKGROUND OF THE INVENTION

It is well known within the educational community that interactive teaching is far better instructional method than the traditional lecturing and note taking method of teaching. Teachers strive to make their interactive teaching as effective and enjoyable as possible for their students. A wide variety of games have been developed specifically for the purpose of assisting teachers in teaching their students a variety of subjects. These games are used on a daily basis by teachers from the pre-kindergarten level to the senior executive MBA programs in this country. Several of these interactive teaching methods involve the use of playing pieces.

Multiple types of playing pieces have been developed to assist in learning. Some of the types of playing pieces include stand-alone playing pieces, playing pieces with snap fasteners to attach to other objects, and magnetic playing pieces. Stand-alone pieces can be used in playing games and can include blocks, showing letters, colors, animals, etc. The playing pieces with snap fasteners and the magnetic playing pieces provide an additional advantage of allowing a user of the playing pieces to attach them to a second object to increase their learning experience. Magnetic playing pieces are far preferable for use with children due to the ease of use with magnetic playing pieces. Unlike snap fasteners, the magnetic playing pieces are attracted to forms of metal and attach to these other devices without much effort on the part of the student.

Several attempts at providing teaching devices using playing pieces have been made. For example, teaching garments such as a cloak or cape worn by the teacher that uses snap fasteners to attach magnetic pieces to the cloak or cape have been disclosed.

SUMMARY OF THE INVENTION

A teaching system for use in teaching while using a display mitt and magnetic playing pieces. The teaching system comprising a set of magnetic playing pieces representing items used in teaching a specific skill, a display mitt comprising a first panel being associated with the palm of a user of the mitt; including a flexible metallic layer for attracting at least one magnet an exterior layer covering the flexible layer of the first panel; a second panel associated with the back of a hand of a user of the mitt; a hand space formed between the first and second panels for receiving at least a portion of a hand of a person so as to provide a firm display surface on at least one of the first and second panels; and a hand entrance opening providing access to the hand space so that the mitt may by worn and taken off; whereby the first and second panels form a mitt that is wearable and can receive the magnetic playing pieces associated with teaching or playing games. The teaching system may also have the second panel include a flexible metallic layer for attracting at least one magnet; an exterior layer overlying at least a portion of the flexible layer of the second panel; whereby the mitt can receive the magnetic playing pieces on the second panel and the first panel for activities associated with education. The teaching system may further comprise a binding disposed around the perimeters of the first panel and the second panel affixing to the first and second panels together whereby rough edges of the panels are covered to prevent a hazard for a user of the glove. The teaching system's exterior layer may be one of a woven or non-woven fabric layer. The teaching system may have the hand space include a thumb space for receiving the thumb of a hand of a wearer of the mitt; a finger space for receiving the remaining part of the hand; wherein the thumb and finger spaces give the display mitt a predefined shape.

The set of magnetic playing pieces includes pieces that may comprise a first side for displaying the item the magnetic playing piece represents; and a magnetic side having a magnetized portion for attaching the magnetic playing piece to an object capable of receiving magnets. The set of magnetic playing pieces may include pieces representing the letters of the alphabet. The set of magnetic playing pieces may include pieces representing colors. The set of magnetic playing pieces may include pieces representing shapes. The set of magnetic playing pieces may include pieces representing animals. The set of magnetic playing pieces include pieces representing emotions.

A display mitt for use in teaching while using magnetic playing pieces comprising: a first flexible metalized panel being associated with the palm of a user of the mitt, the panel for attracting at least one magnet, the first panel having a predisposed shape provided by an outer periphery of the first the panel; a second panel associated with the back of a hand of a user of the mitt having a predisposed shape provided by an outer periphery of the second panel; a play display surface comprising at least a portion of the first panel for receiving magnetic playing pieces; the first and second panels being secured around at least a portion of the outer periphery of the first and second panels to form a hand space for receiving at least a portion of a hand of a person so as the hand supports the display surface; and a hand entrance opening providing access to the hand space so that the display mitt may by worn and taken off; whereby the first and second panels form a mitt that is wearable and can receive magnetic playing pieces. The second panel may include a flexible metallic layer for attracting at least one magnet; an exterior layer overlying at least a portion of the flexible layer of the first panel; an exterior layer overlying at least a portion of the flexible layer of the second panel; a second play display surface comprising at least a portion of the second panel for receiving magnetic playing pieces; whereby the mitt can receive magnetic playing pieces on the second play display surface and the play display surface of the first panel for activities associated with education. The display mitt may further comprise a binding disposed around a portion of the peripheries of the first panel and the second panel affixing to the first and second panels together whereby rough edges of the panels are covered to prevent a hazard for a user of the glove. The binding may be a sewn selvage. The exterior layer may be one of a woven or non-woven fabric layer. The fabric layer may be composed of nylon. The fabric layer may be a woven cloth layer. The hand space may include a thumb space for receiving the thumb of a hand of a wearer of the mitt a finger space for receiving the remaining part of the hand; wherein the thumb and finger spaces give the display mitt a predefined shape.

A method of teaching students using a display mitt and magnetic playing pieces comprising the steps of: providing a display mitt having opposing side panels which define an interior hand space wherein at least one of the panels provides a play display surface for attracting magnetic playing pieces; placing the mitt on the hand of a user so that the hand is disposed between the side panels to provide a supported display surface for the playing pieces; eliciting a response from a student that requires placement of a desired playing piece on the mitt; and placing a selected magnetic piece on the mitt indicating the students understanding of the concept being taught in a manner to aid teaching. The method may further comprise the steps of: selecting an additional magnetic piece in response to a request made by the teacher; and placing the selected magnetic piece on the display surface of the display mitt. The method may further comprise the steps of: selecting a magnetic piece currently on the display surface of the display mitt in response to a request to find the piece that does not have similar characteristics as the other magnetic pieces; and removing the selected magnetic piece from the display surface of the mitt. The method may further comprise the step of performing an action in response to placing a magnetic playing piece on the mitt. The step of performing an action may be singing a song. The step of performing an action may be speaking. The step of performing an action may be raising a hand.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a perspective view of the mitt being worn by the user having four magnetic playing pieces representing letters associated with the mitt;

FIG. 4 is a perspective sectional view of the mitt;

DESCRIPTION OF AN EMBODIMENT

Figure 1:
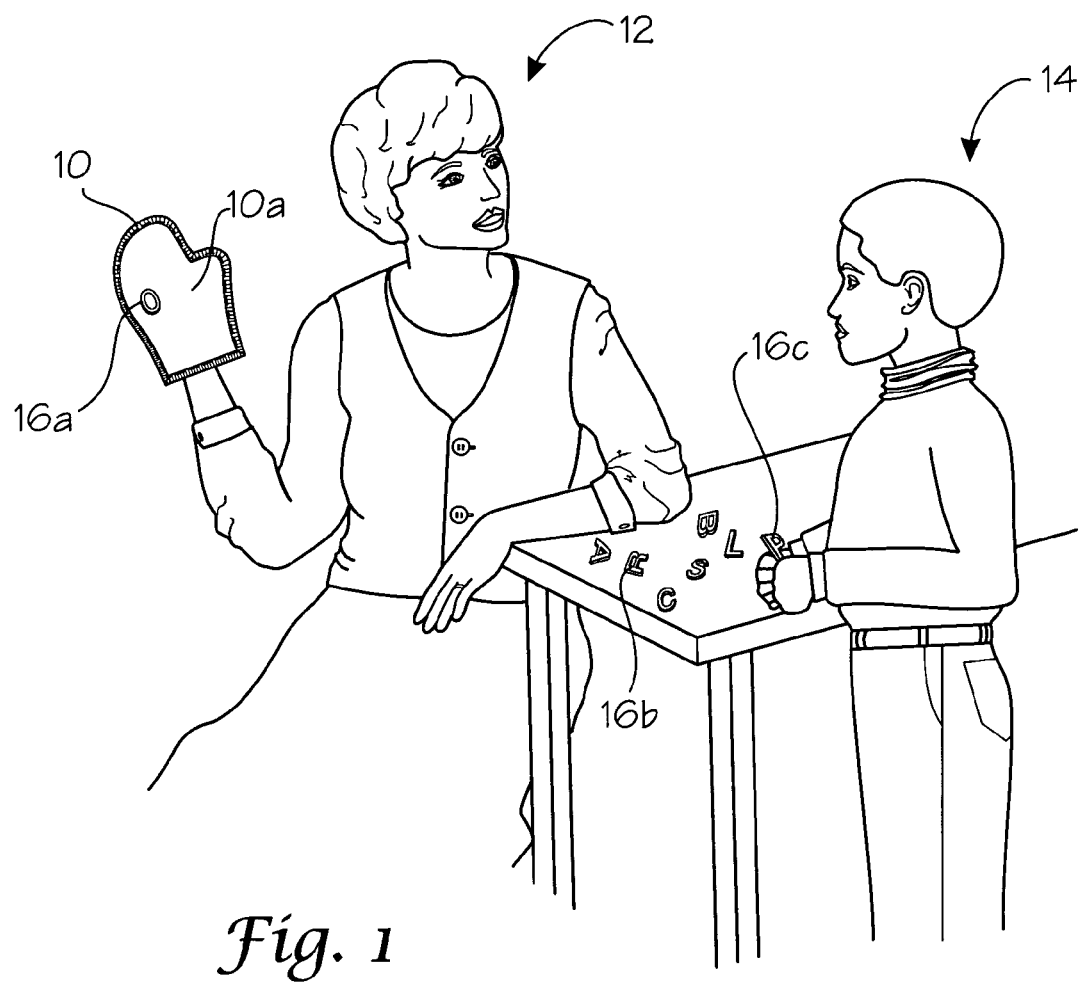
FIG. 1 is a perspective view of the mitt being worn by a teacher having one magnetic playing piece attached to the mitt.

Referring now in more detail to the drawings, the invention will now be described in more detail.

Teacher 12 is shown wearing display mitt 10 on her right hand. In this example, she is using display mitt 10 to teach student 14 the alphabet. The display mitt can be used to teach a variety of skills including, but not limited to, the alphabet, colors, shapes, sorting, social skills and animals. Teaching the alphabet is used for explanation purposes only and does not limit the scope of the invention in any way. Teacher 12 is using magnetic pieces 16 in conjunction with mitt 10 to teach student 14 the alphabet. Magnetic playing pieces 16 can be received by the display mitt 10. The display mitt may contain two panels including a first panel 10a and a second panel that is not shown in this figure. The first panel 10a may be associated with the palm of a hand of a user of the mitt. In addition to the teaching advantages associated with wearing a mitt on the hand, the hand also may provide support to the first panel 10a so as to better support magnetic playing pieces including magnetic piece 16a. Display mitt 10 does not contain any magnets and does not attract metal pieces generally, rather, it contains a metallic layer for receiving magnetic playing pieces.

The metallic layer located in both the first and second panels of the mitt may attract the magnetic playing pieces as a normal object containing metal would. Thus, when the magnetic playing piece is placed on to the mitt, it is attracted to the mitt due to the metallic sheet. The magnetic playing piece will thus remain in the same position on the mitt. Further, the magnetic playing piece may be removed with ease because of the relative weakness of magnetic attraction.

Returning to the example described above, the teacher is trying to teach the student the alphabet. At this point in the lesson the teacher has placed magnetic playing piece 16a, which represents the letter O on the display mitt. She has asked student 14 to determine the next letter in the alphabet. Student 14 has chosen not to select magnetic playing piece 16b, which is the letter A which would be the incorrect choice. Student 14 has chosen the correct answer by picking up playing piece 16c, which is the letter P.

Figure 2:
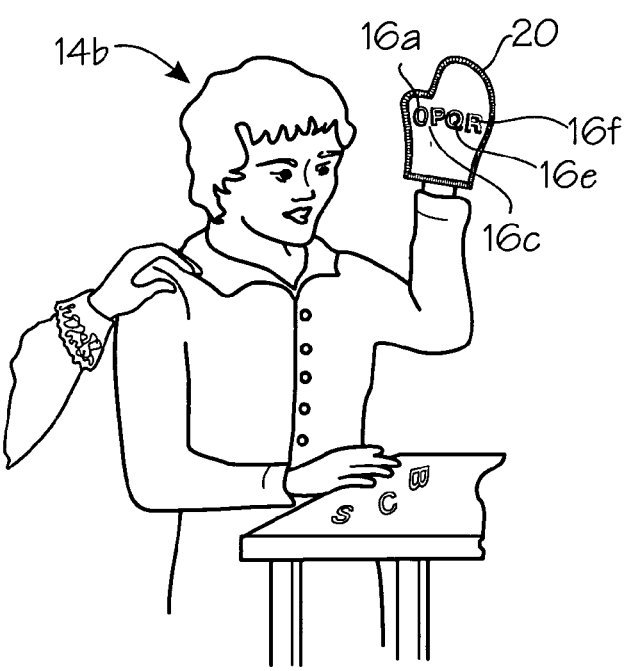
FIG. 2 is a perspective view of the mitt being worn by a student having four magnetic playing pieces attached to the mitt.

FIG. 2 and FIG. 3 show new student 14b using a smaller display mitt 20. The display mitt can come in a variety of sizes, including, but not limited to, the larger mitt for use by teachers shown as 10 and the smaller mitt for use by students shown as 20. The mitts may function in the same or a similar manner, but are adapted for being worn by people with different sized hands. Student 14b has placed display mitt 20 on their left hand. In further embodiments, the display mitt has two panels, both of which include a metallic layer. Thus, the glove may be worn on either the left or the right hand of a user, and receive magnetic playing pieces on both sides of the mitt. The student has placed the next four letters in sequence from the alphabet on the display mitt by using magnetic playing pieces 16a, 16c, 16e, and 16f, which represent the letters O, P, Q, R respectively. Student 14b has learned the order of the alphabet with the assistance of the display mitt and the magnetic playing pieces.

FIG. 4 is a cut-away view illustrating the layers of display mitt 10. In an embodiment, there may be two flexible metallic layers 46 and 50 in the mitt. This allows for a wearer of the mitt to place magnetic playing pieces on either the front of the hand or the back of the hand or on both sides while wearing the mitt. In an embodiment, the mitt may only have one flexible metallic layer for attracting magnetic playing pieces. This would require a user of the mitt to place pieces only on the panel associated with the side of a hand having the metallic layer. Flexible metallic layers 46 and 50 may be any suitable sheets such as those manufactured by Yuxiang Magnetic Materials Ind. Co., Ltd. of Xiamen, China. Each metallic layer may be covered on both sides by an exterior layer. In further embodiments only the top side of each metallic layer would be covered by an exterior layer. The flexible metallic layer may be coated with nylon, thus creating an exterior nylon layer, or a separate nylon layer may be attached to the flexible metallic layer. The flexible metallic layer may be approximately 4/10ths of a millimeter thick. Other thicknesses may be used depending on the consistency desired including, but not limited to, widths of 3/10ths, 6/10ths and 7/10ths of a millimeter. The exterior layer covered flexible metallic layers may be cut into the form of a mitt as shown in FIG. 4. In further embodiments, the mitt may have five receiving areas for each finger of a user of the mitt. A binding 40, may then be placed around the perimeter of the metallic layer and exterior layer. The exterior layer and the flexible metallic layers are then sewn together with thread 42 leaving the bottom portion of the mitt open so that it can be worn. By attaching the sheets in such a way, a hand receiving space is formed for allowing user to wear the mitt.

In a further embodiment, the hand receiving space may include a thumb receiving area for receiving the thumb of a user and a finger receiving area for receiving the remaining portion of a hand of a user. By using two separate spaces, the mitt may take on the appearance of a traditional oven mitt. The mitt may also have five receiving areas for each of the five fingers of a user. In a further embodiment, the mitt may have one receiving space for the entire hand of the user.

Figure 5:
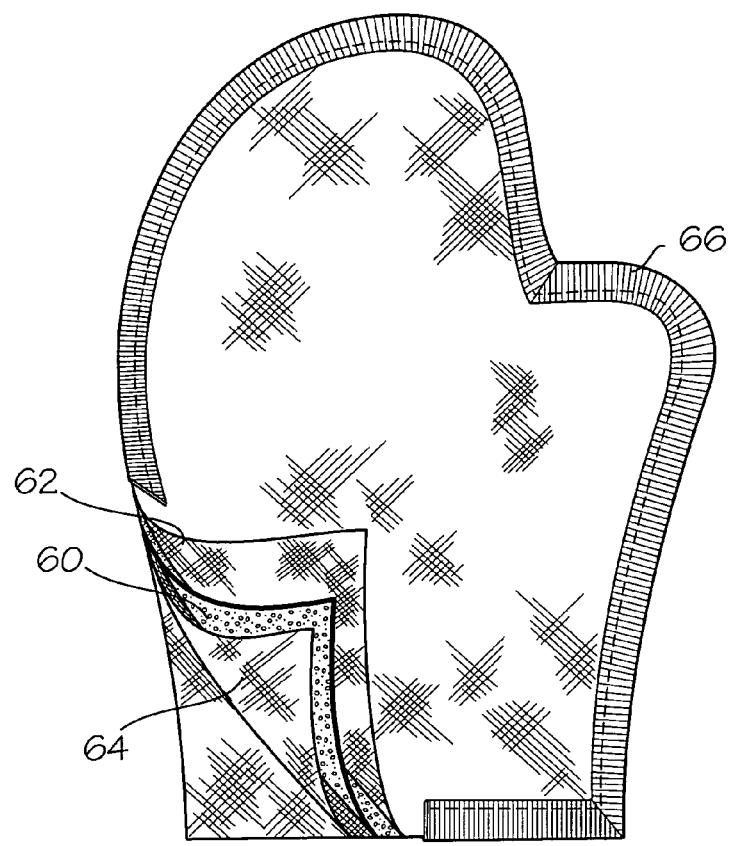
FIG. 5 is another view of the mitt.

FIG. 5 shows a turned up cross-section of the first panel of the mitt. The mitt may have a first and second panel attached to form an interior hand receiving space and give the appearance of a mitt. The figure shows flexible metallic sheet 60 of the first panel. Exterior layers 62 and 64 are also shown. As described above, the exterior layers may be nylon layers, cloth layers, or another type of layer including fabric layers. Exterior layers 62 and 64 may be separate layers that are attached to metallic sheet 60 via glue, sewed on to metallic sheet 60, or any other feasible means of attachment. Alternatively, metallic layer 60 may be coated with nylon so as to provide exterior layers 62 and 64. Binding 66 may be used to protect the hand of a user from any sharp edges of the first and second panels. In a further embodiment, binding 66 is sewn on to the first and second panels providing for an interior hand receiving space.

Figure 6:
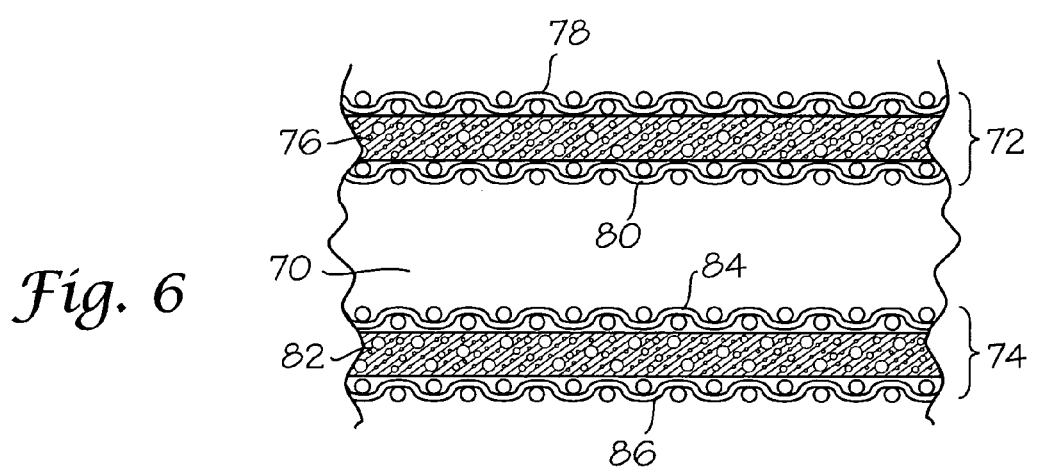
FIG. 6 is a bottom sectional view of the mitt.

Referring now to FIG. 6, a bottom view of the mitt is shown sectionally. Hand receiving space 70 is formed by attaching said first panel 72 to second panel 74. The hand receiving space may allow a user to wear the mitt to enhance the teaching or game playing associated with the mitt. Further, the hand of a wearer of the mitt may provide additional support for the metallic layers to receive magnetic playing pieces associated with teaching or playing a game. First panel 72 may have a flexible metallic layer 76 that may be covered by exterior layers 78 and 80. Second panel 74 may have a flexible metallic layer 82 that may be covered by exterior layers 84 and 86.

The mitt may be used as a teaching aid or as an aid to playing a game. In order to use this mitt in such a manner, it should be either worn by a teacher or provided to a student for wearing. Once provided to a student for wearing, the student should place their hand in the mitt so that their hand is disposed between the panels to provide support for receiving magnetic playing pieces. The student should then be provided with a plurality of magnetic playing pieces. These magnetic playing pieces may include letters of the alphabet, colors, shapes, animals, words, maps, household items, and all other types of magnetic playing pieces associated with playing games or teaching. In response to a request by the teacher, the student should select a magnetic playing piece and place it on the mitt. If the student places the incorrect playing piece on the mitt, the teacher should correct the student and have them place the proper magnetic playing piece on the mitt. In response to a further command, the student should place further magnetic playing pieces on the mitt. Later, the student may be asked to remove the playing pieces from the mitt in response to a request. The student should remove the piece in response to this request and leave the remaining magnetic pieces on the mitt.

The games that can be played and teaching that can be done using the mitt include matching games. In matching games, set of magnetic playing pieces are provided to the student. Within the set of magnetic pieces there are multiple pairs of matching magnetic playing pieces. The magnetic playing pieces may take on the form of colors, animals, shapes, etc. Once one of the pieces is placed on the mitt, the student must search through the remaining playing pieces to find the playing piece that matches the prior selected piece. Once the student places the second playing piece on the mitt, the teacher should determine if the proper pieces have been placed. The teacher determines whether or not the proper piece has been placed by looking to see if the two pieces match. If the two pieces match, the teacher should congratulate the student and provide positive reinforcement for completing the task properly. Should the pieces not match, the teacher should correct the student and ask the student to try to match the piece again properly. Social skills games may be played using the mitt using magnetic playing pieces that represent feelings. The magnetic playing pieces provided in this game represent feelings and emotions. For example, the playing pieces may be faces that are frowning to represent disappointment or anger, smiling to represent happiness, crying to represent sadness, etc. The students can be read a story, or simply told a sentence that involves or evokes emotion. Upon reading the story or the sentence, the student should be prompted to select a playing piece and place it on the display mitt representing either their emotion, or the emotions of a character in the story or sentence. If the story clearly shows that the character is sad, and the student selects a smiley face playing piece, the teacher should discuss this selection with the student. The student should be taught that in a situation where an individual is sad, they usually do not smile, rather they are more apt to cry. Upon teaching the student this, the student should be able to correctly select the playing piece representing the crying character to represent this feeling.

A song may be taught to a student by placing a magnetic picture on the mitt to identify the chorus of a song. When the chorus should occur, the teacher should raise their hand while wearing the mitt to cue the students to sing.

The mitt can be used in a story continuation format where the students would place magnetic pieces on the mitt to create a story. The magnetic pieces could be characters, emotions, objects that the characters encounter, etc.

By placing multiple playing pieces on the mitt, a story is created based on characters, the objects they encounter, and the emotions they feel. For example, a magnetic piece representing a student can be placed on the mitt representing the fact that a student is the character in the story. Then a playing pieces representing a puppy can be placed on the mitt representing the fact that the student encounters the puppy. Finally, a smiling face playing piece may be placed on the mitt representing the emotion felt by the student upon finding the dog. Thus, the student has created a sentence or story saying that a student met a puppy and was happy. For example, the magnetic playing pieces could represent articles of clothing. Multiple hats, including baseball hats, cowboy hats and ski hats may be placed on the mitt. Further, a piece that doesn't belong with the hat category such as shoes, can also be placed on the mitt. The teacher would instruct the student to remove the piece that does not long belong with the other magnetic pieces. The mitt may be used for teaching classifying through playing a classifying game. Multiple magnetic pieces representing various objects can be placed on the mitt. The student would then choose the piece that does not belong with the other magnetic pieces. The student would then remove that piece from the mitt. If the student selects the shoes, they have obviously selected the piece that does not belong with the headgear pieces shown. The teacher should provide positive reinforcement to the student for making the correct choice. If the student selects the wrong piece, one of the headgear rather than the shoes, the teacher should discuss this choice with the student, and teach them that the shoes do not belong with the other items because the other items are all items worn on the head of a person.

The examples above, including the alphabet examples, are a few examples of the many open-ended uses for the mitt. Any type of game or learning activity involving magnetic playing pieces that would fit on the mitt could be played using the mitt.

While an embodiment of the invention has been described using specific terms, such description is for illustrative purposes only, and it is to be understood that changes and variations may be made without departing from the spirit or scope of the following claims.

What is claimed is:

1. A teaching system for use in teaching while using a display mitt and magnetic playing pieces comprising:
   a set of magnetic playing pieces representing items used in teaching a specific skill;
   a display mitt comprising:
      a first panel being generally coextensive with the palm and fingers of a user of the mitt; including:
      a flexible metallic layer for attracting at least one magnet;
      an exterior layer covering said flexible layer of said first panel;
      a second panel generally coextensive with the back of a hand and fingers of a user of the mitt;
      a hand space formed between said first and second panels for receiving at least a portion of a hand of a person so as to provide a firm display support;
      an enlarged generally continuous display panel provided by at least one of said first and second panels; and
      a hand entrance opening providing access to said hand space so that said mitt may be worn and taken off;
      whereby said first and second panels form a mitt that is wearable and can receive said magnetic playing pieces associated with teaching or playing games for display.

2. The teaching system of claim 1, wherein said second panel includes:
   a flexible metallic layer for attracting at least one magnet;
   an exterior layer overlying at least a portion of said flexible layer of said second panel;
   whereby said mitt can receive said magnetic playing pieces on said second panel and said first panel for activities associated with education.

3. The teaching system of claim 1, further comprising:
   a binding disposed around the perimeters of said first panel and said second panel affixing to said first and second panels together whereby rough edges of said panels are covered to prevent a hazard for a user of the glove.

4. The teaching system of claim 1, wherein said exterior layer is one of a woven or non-woven fabric layer.

5. The teaching system of claim 1, wherein said hand space includes:
   a thumb space for receiving the thumb of a hand of a wearer of the mitt;
   a finger space for receiving the remaining part of the hand;
   wherein the thumb and finger spaces provide said display mitt a predefined shape.

6. The teaching system of claim 1 wherein said set of magnetic playing pieces includes pieces comprising:
   a first side for displaying the item the magnetic playing piece represents; and
   a magnetic side having a magnetized portion for attaching said magnetic playing piece to an object capable of receiving magnets.

7. The teaching system of claim 1 wherein said set of magnetic playing pieces include pieces representing the letters of the alphabet.

8. The teaching system of claim 1 wherein said set of magnetic playing pieces include pieces representing colors.

9. The teaching system of claim 1 wherein said set of magnetic playing pieces include pieces representing shapes.

10. The teaching system of claim 1 wherein said set of magnetic playing pieces include pieces representing animals.

11. The teaching system of claim 1 wherein said set of magnetic playing pieces include pieces representing emotions.

12. A display mitt for use in teaching while using magnetic playing pieces comprising:
    a first flexible metalized panel being generally coextensive with the palm and fingers of a user of the mitt, said panel for attracting at least one magnet, said first panel having a predefined shape provided by an outer periphery of said first said panel;
    a second panel generally coextensive with the back of a hand and fingers of a user of the mitt having a predisposed shape provided by an outer periphery of said second panel;
    a play display surface comprising at least a portion of said first panel for receiving magnetic playing pieces;
    said first and second panels being secured around at least a portion of said outer periphery of said first and second panels to form a hand space for receiving at least a portion of a hand of a person so as the hand supports said display surface; and
    a hand entrance opening providing access to said hand space so that said display mitt may by worn and taken off;
    whereby said first and second panels form a mitt that is wearable and can receive magnetic playing pieces.

13. The display mitt of claim 12, wherein said second panel includes:
    a flexible metallic layer for attracting at least one magnet;
    an exterior layer overlying at least a portion of said flexible layer of said first panel;
    an exterior layer overlying at least a portion of said flexible layer of said second panel;
    a second play display surface comprising at least a portion of said second panel for receiving magnetic playing pieces;
    whereby said mitt can receive magnetic playing pieces on said second play display surface and said play display surface of said first panel for activities associated with education.

14. The display mitt of claim 12, further comprising:
    a binding disposed around a portion of the peripheries of said first panel and said second panel affixing to said first and second panels together whereby rough edges of said panels are covered to prevent a hazard for a user of the glove.

15. The mitt of claim 14, wherein said binding is a sewn selvage.

16. The display mitt of claim 12, wherein said exterior layer is one of a woven or non-woven fabric layer.

17. The display mitt of claim 16, wherein said fabric layer is composed of nylon.

18. The display mitt of claim 16, wherein said fabric layer is a woven cloth layer.

19. The display mitt of claim 12, wherein said hand space includes:
- a thumb space for receiving the thumb of a hand of a wearer of the mitt;
- a finger space for receiving the remaining part of the hand; wherein the thumb and finger spaces give said display mitt a predefined shape.

20. A method of teaching students using a display mitt and magnetic playing pieces comprising the steps of:
- providing a display mitt having opposing side panels which define an interior hand space wherein at least one of said panels provides a play display surface for attracting magnetic playing pieces;
- placing the mitt on the hand of a user so that the hand with fingers is disposed between the side panels to provide a supported, generally continuous display surface generally coextensive with the hand for attachment of the playing pieces;
- eliciting a response from a student that requires placement of a desired playing piece on the mitt; and
- placing a selected magnetic piece on the mitt indicating the students understanding of the concept being taught in a manner to aid teaching.

21. The method of claim 20 further comprising the steps of:
- selecting an additional magnetic piece in response to a request made by the teacher; and
- placing the selected magnetic piece on the display surface of the display mitt.

22. The method of claim 20 further comprising the steps of:
- selecting a magnetic piece currently on the display surface of the display mitt in response to a request to find the piece that does not have similar characteristics as the other magnetic pieces; and
- removing the selected magnetic piece from the display surface of the mitt.

23. The method of claim 20 further comprising the step of performing an action in response to placing a magnetic playing piece on the mitt.

24. The method of claim 23, wherein the step of performing an action is singing a song.

* * * * *